United States Patent
Khanna et al.

(10) Patent No.: US 8,104,081 B2
(45) Date of Patent: Jan. 24, 2012

(54) IP SECURITY WITH SEAMLESS ROAMING AND LOAD BALANCING

(75) Inventors: Bakul Khanna, Lexington, MA (US); Ron Pon, Kanata (CA); Ramin Taraz, Lexington, MA (US)

(73) Assignee: Avaya Inc., Basking Ridge, NJ (US)

( * ) Notice: Subject to any disclaimer, the term of this patent is extended or adjusted under 35 U.S.C. 154(b) by 1199 days.

(21) Appl. No.: 11/273,945

(22) Filed: Nov. 15, 2005

(65) Prior Publication Data

US 2007/0113275 A1    May 17, 2007

(51) Int. Cl.
*G06F 9/00* (2006.01)
*G06F 15/16* (2006.01)
*G06F 17/00* (2006.01)

(52) U.S. Cl. ............ 726/15; 370/331; 370/401; 709/217

(58) Field of Classification Search ............... 726/11–15; 380/255–256; 713/150–154
See application file for complete search history.

(56) References Cited

U.S. PATENT DOCUMENTS

| | | | |
|---|---|---|---|
| 6,954,790 B2 * | 10/2005 | Forslow | 709/227 |
| 7,548,945 B2 * | 6/2009 | Asnis | 709/201 |
| 7,653,700 B1 * | 1/2010 | Bahl et al. | 709/217 |
| 7,734,019 B1 * | 6/2010 | Terpstra | 379/37 |
| 2001/0009025 A1 * | 7/2001 | Ahonen | 713/161 |
| 2003/0069016 A1 * | 4/2003 | Bahl et al. | 455/432 |
| 2003/0093691 A1 * | 5/2003 | Simon et al. | 713/201 |
| 2003/0117948 A1 * | 6/2003 | Ton et al. | 370/218 |
| 2004/0068668 A1 * | 4/2004 | Lor et al. | 713/201 |
| 2004/0264481 A1 * | 12/2004 | Darling et al. | 370/401 |
| 2005/0198691 A1 | 9/2005 | Xiang et al. | |
| 2006/0262732 A1 * | 11/2006 | Joutsenvirta et al. | 370/254 |
| 2007/0165572 A1 * | 7/2007 | Lenzarini | 370/331 |
| 2008/0200168 A1 * | 8/2008 | Jiang | 455/432.1 |

* cited by examiner

*Primary Examiner* — Taghi Arani
*Assistant Examiner* — Mahfuzur Rahman
(74) *Attorney, Agent, or Firm* — Chapin IP Law, LLC; David W. Rouille, Esq.

(57) ABSTRACT

Described are a method and system for seamless roaming of a mobile node during a VPN session. A VPN session between the mobile node and a current VPN server in a network is established and synchronized with at least one fail-over VPN server in the network. An address change message is sent to the current VPN server and the fail-over VPN servers upon roaming of the mobile node. A fail-over VPN server responds with a reply message and is registered as a current VPN server for continuation of the VPN session. To load balance, a load query message is sent to the current VPN server and the fail-over VPN servers. Reply messages include server performance characteristics of the VPN servers. The VPN session can be transferred from the current VPN server to a fail-over VPN server in response to the server performance characteristics.

5 Claims, 4 Drawing Sheets

IP SECURITY WITH SEAMLESS ROAMING AND LOAD BALANCING

FIELD OF THE INVENTION

The invention relates generally to telecommunications. More particularly, the invention relates to a method and system for seamless roaming and load balancing during a VPN session.

BACKGROUND OF THE INVENTION

In recent years the number of wireless networks has increased significantly. Wireless connectivity enables users to have access to other users, local area networks (LANs) and wide area networks (WANs), including the Internet, without requiring the user to remain at a single location. Moreover, the user's mobility is generally not restricted within the coverage area of the wireless network.

Wireless connectivity is not without disadvantages. Information transmitted in a wireless network can be intercepted by anyone in the range of the user that has a wireless receiver. Various types of security solutions have been developed to address these security concerns. One solution, virtual private networks (VPNs), provides security to wired and wireless networks. A VPN connects network resources through a secure protocol tunnel so that resources on separate networks seem to share a common private backbone. VPNs can be used, for example, to enable an employee to connect to an office LAN via an insecure home Internet connection or to permit a salesperson to access a corporate LAN while on travel. Advantageously, users realize the same confidentiality provided by private networks although the tunnel may utilize a public network.

Security is achieved, for example, using Internet Protocol security (IPSec). IPSec is a security architecture for Internet protocol (IP) communication that is based on a set of protocols developed by the Internet Engineering Task Force (IETF) for the secure exchange of packets at the IP layer. IPSec provides security by enabling a system to select required security protocols, determine one or more algorithms to for implementing security, and manage the use of cryptographic keys. The sending and receiving devices typically share a public key which is handled through an Internet Security Association and Key Management Protocol (ISAKMP).

A security association (SA) is a security-protocol-specific set of parameters that defines the services and mechanisms used to protect traffic at a security protocol location. These parameters typically include algorithm identifiers, modes, cryptographic keys, and the like. SAs are generally referred to by their associated security protocols (e.g., ISAKMP SA).

Today, IPSec VPN users are "anchored" to a specific VPN server or VPN cluster. Consequently, the mobility of each user is limited according to the reachability of its VPN server/cluster. As the user roams, some networks may become unreachable while other networks may become reachable. If a mobile user moves outside a private network and loses connectivity, a new IPSec connection may need to be established with a different VPN server or cluster. To overcome this limitation, the wireless device of the mobile user can be registered with a gateway VPN server at the edge of the private network and a public network, instead of a VPN server inside the private network. The gateway VPN server is reachable from the public network thus enabling seamless roaming when the mobile user transitions between the private and public networks. However, this solution can result in "tromboning" traffic within the private network as described in more detail below.

VPN users can also be affected by changes in server loads. A VPN user anchored to a specific VPN server can experience performance degradation if the load of that server increases during the VPN session. Current load-balancing algorithms for servers only act upon new VPN session requests to distribute server loads.

What is needed is a method that overcomes the above-described problems for VPN users. The present invention satisfies this need and provides additional advantages.

SUMMARY OF THE INVENTION

In one aspect, the invention features a method for seamless roaming of a mobile node during a VPN session. A VPN session for the mobile node and a current VPN server in a network is established. The VPN session is synchronized with at least one fail-over VPN server in the network. An address change message is sent to the current VPN server and the fail-over VPN servers upon roaming of the mobile node. A reply message is sent from one of the fail-over VPN servers in response to the address change message. The fail-over VPN server that sent the reply message is registered as a current VPN server for continuation of the VPN session.

In another aspect, the invention features a method for load balancing during a VPN session of a node. The VPN session is established for the node and a current VPN server in a network. The VPN session is synchronized from the current VPN server to at least one fail-over VPN server in the network. A load query message is sent to the current VPN server and the fail-over VPN servers. A reply message is sent from the current VPN server and at least one of the fail-over VPN servers in response to the load query message. Each reply message includes server performance characteristics information for the respective VPN server. The VPN session is transferred from the current VPN server to one of the fail-over VPN servers in response to the server performance characteristics information in the reply messages.

In yet another aspect, the invention features a system for seamless roaming of a mobile node during a VPN session. The system includes a plurality of VPN servers each in communication with the other VPN servers over a network. Each VPN server is adapted for communication with the mobile node and is configured for operation as a fail-over VPN server for the VPN session in response to a synchronization by one of the other VPN servers. Each VPN server is configured to send a reply message to the mobile node in response to an address change message and to replace one of the other VPN servers as a current VPN server in response to a designation by the mobile node during the VPN session.

In still another aspect, the invention features a system for load balancing during a VPN session of a node. The system includes a plurality of VPN servers each in communication with the other VPN servers over a network. Each VPN server is adapted for communication with the node during the VPN session. Each VPN server is configured to send a reply message to the node to indicate a server performance characteristic for the respective VPN server in response to a load query message and is configured to replace one of the other VPN servers as a current VPN server in response to a selection by the node.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1:
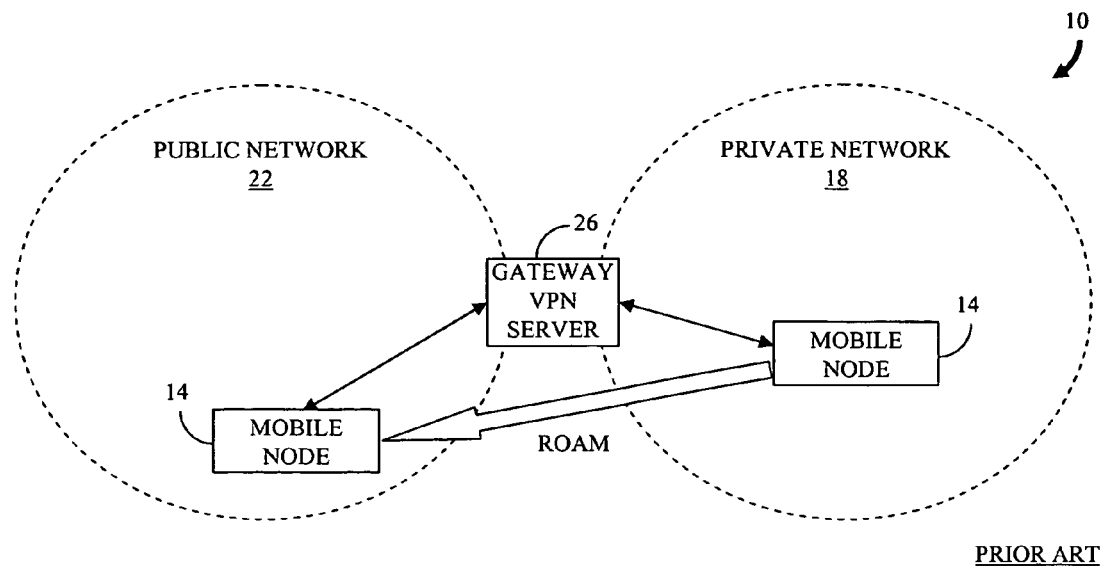
FIG. 1 illustrates a network configuration known in the art used for seamless roaming.

IPSec users are generally registered to a specific VPN server. Mobile nodes are limited in mobility because a change in a mobile node's IP address can result in loss of connectivity with the VPN server and, therefore, the need to initiate a new IPSec connection with a new VPN server. As used herein, mobile node means any mobile device such as a laptop computer, a personal digital assistant, a web-enabled cellular telephone and the like that can be used to communicate with other devices and resources located on a network. The change in IP address can be due to a mobile node roaming from one network with one IP address to a different network with a different IP address. For example, the mobile node can leave a coverage area for a first wireless network and join a different wireless network that is available. In another example, the change in IP address results from a user-initiated transition between two simultaneously available networks. For instance, the mobile node can be a laptop computer that is removed from a docking station on a first network (e.g., local area network (LAN)) and is joined to a second network (e.g., wireless network). The transfer between networks may be made to enable user mobility or to obtain greater bandwidth available over the wireless network. In these examples, the user experiences a disruption when the original IPSec session terminates and a new IPSec is established.

U.S. patent application Ser. No. 10/791,414, filed Mar. 3, 2004 and incorporated herein by reference, describes a solution to the roaming problem. According to the disclosed method a secure network connection established between the mobile node and a security gateway (i.e., the VPN server) is maintained after it is determined that the mobile node has changed its IP address. The mobile node detects its change of IP address when roaming to another network. The mobile node then updates its ISAKMP SAs and IPSec SAs with its new IP address. Using the current ISAKMP SA, a secure notification is sent from the mobile node to the security gateway. This notification, or "address change message", includes the original IP address and the new IP address for the mobile node. The security gateway determines the appropriate ISAKMP SA for the mobile node based on information in the address change message. The SA is then used to extract the old IP address and new IP address from the address change message, enabling the IPSec session to be maintained. IP traffic between the mobile node and VPN server continues without disruption during the address change. This technique allows the mobile node to change its IP address and stay anchored to the VPN server as long as the VPN server remains reachable to the mobile node. However, the IPSec session is lost if the mobile node is beyond the range of the VPN server or the VPN server is otherwise unreachable. For example, the address change message may not reach the VPN server due to a network address translation (NAT) problem or a network address port translation (NAPT) problem. If the address change message fails to reach the VPN server, the mobile node will not receive a response and the existing IPSec session is dropped. The mobile node then has to initiate a new IPSec session with a different VPN server because the VPN server in the original network is not reachable from the new network.

In brief overview, the present invention allows a mobile node to maintain an IPSec session without disruption during roaming even if the original VPN server becomes unreachable. The mobile node is effectively registered, or "anchored", at multiple VPN servers, including a current VPN server and one or more fail-over VPN servers. The mobile node transparently communicates with multiple VPN servers throughout the IPSec session. If the mobile node roams so that the current VPN server becomes unreachable, one of the fail-over VPN servers is used to continue the IPSec session. Advantageously, a node can periodically determine the load on the current VPN server and the fail-over VPN servers so that an existing IPSec session can be transitioned to an appropriate fail-over VPN server for dynamic load-balancing.

FIG. 1 illustrates a network configuration 10 as known in the art used to achieve "seamless" roaming. In this configuration 10, a mobile node 14 roams from a private network 18 to a public network 22 without breaking an IPSec session and, therefore, without the need to initiate a new IPSec session. When in the private network 18, the mobile node 14 is anchored at a gateway VPN server 26 at the edge of the private network 14 and the public network 22. The gateway VPN server 26 is always reachable from the public network 22 therefore seamless roaming is possible. However, traffic within the private network 18 can experience a "tromboning" effect which may not be acceptable for private networks in large corporations and organizations. More specifically, all traffic destined for a correspondent node (i.e., the peer with which the mobile node corresponds) in the same network goes to the gateway VPN server 26 and then to the correspondent node. Moreover, gateway VPN servers are typically engineered according to an expected number of users located outside the network, not for traffic between correspondent nodes within the network. Thus maintaining a single VPN server (i.e., the gateway VPN server 26) on a network is practical only for small networks. Large corporate networks with internal routing typically have many VPN servers.

Figure 2:
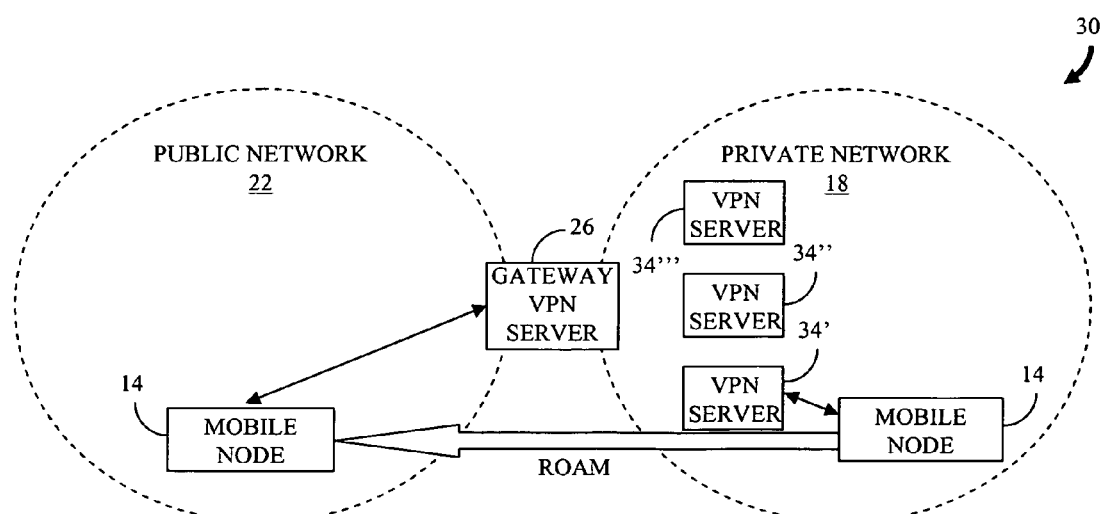
FIG. 2 illustrates how an IPSec session can be broken for a mobile node anchored to an internal VPN server in a private network.

FIG. 2 illustrates another network configuration 30 in which a mobile node 14 roams from a private network 18 to a public network 22. The private network 18 may be maintained by a large corporation or organization. When in the private network 18, the mobile node 14 has access to any number of "internal" VPN servers 34', 34" and 34'" (generally 34), only three of which are shown for clarity. The availability of multiple VPN servers 34 reduces the effects of tromboning described above.

An IPSec session for the mobile node 14 is anchored at one of the internal VPN servers 34'. When the mobile node 14 moves from the private network 18 to the public network 22, the internal VPN server 34' can be unreachable due to a network address translation (NAT) problem or a network address port translation (NAPT) problem. The problem can arise because the anchored VPN server 34' is located in a subnet using a private IP address. Consequently, connectivity between the mobile node 14 and internal VPN server 34' is lost and the IPSec session terminates. The mobile node 14 then has to initiate an IPSec session with the gateway VPN server 26 to re-establish the IP tunnel. To avoid the problem, the mobile node 14 can always anchor to the gateway VPN server 26 if public roaming is planned; however, this solution creates the tromboning problem described above.

Figure 3:
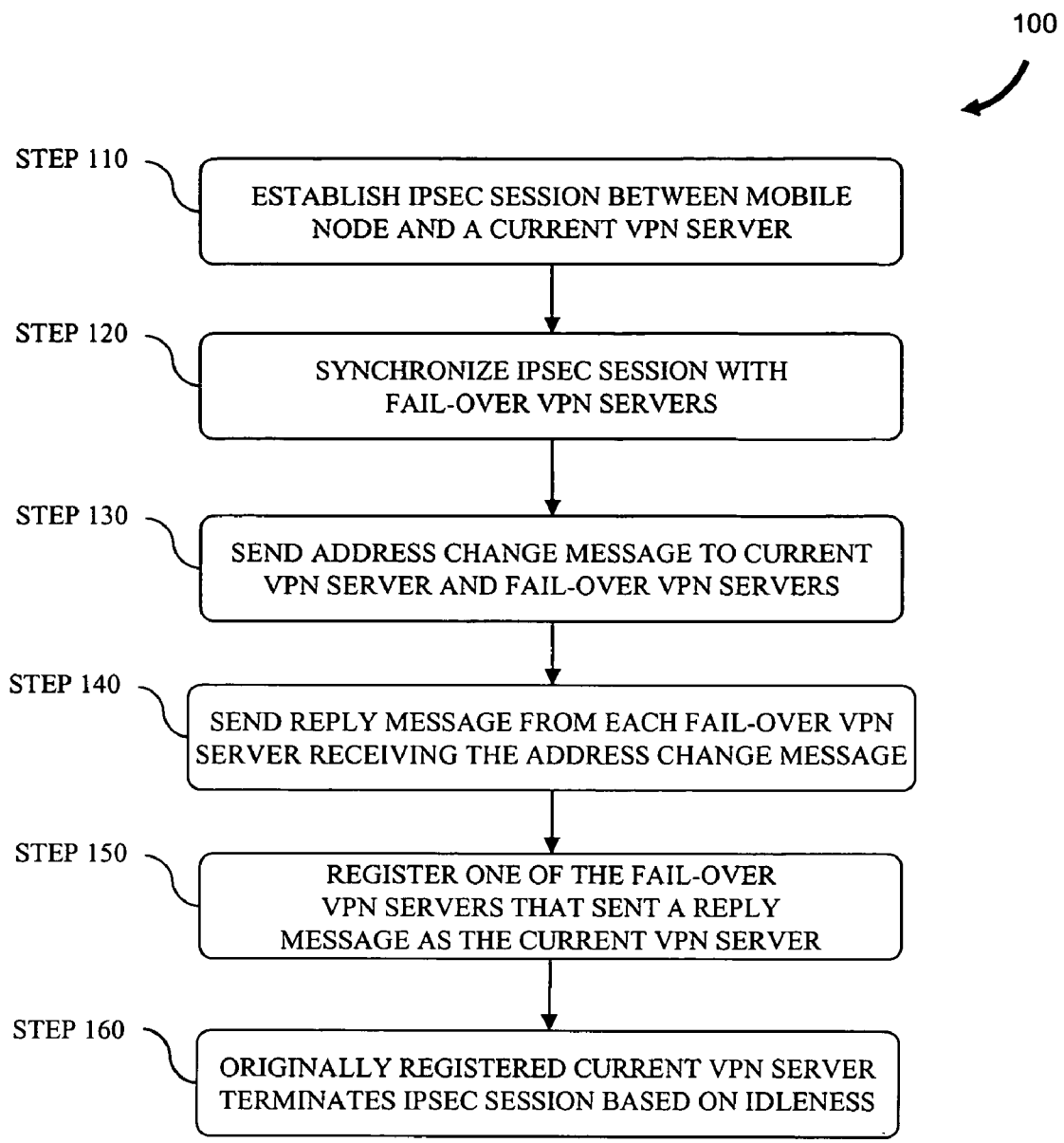
FIG. 3 is a flowchart representation of an embodiment of a method for seamless roaming in accordance with the invention.
Figure 4:
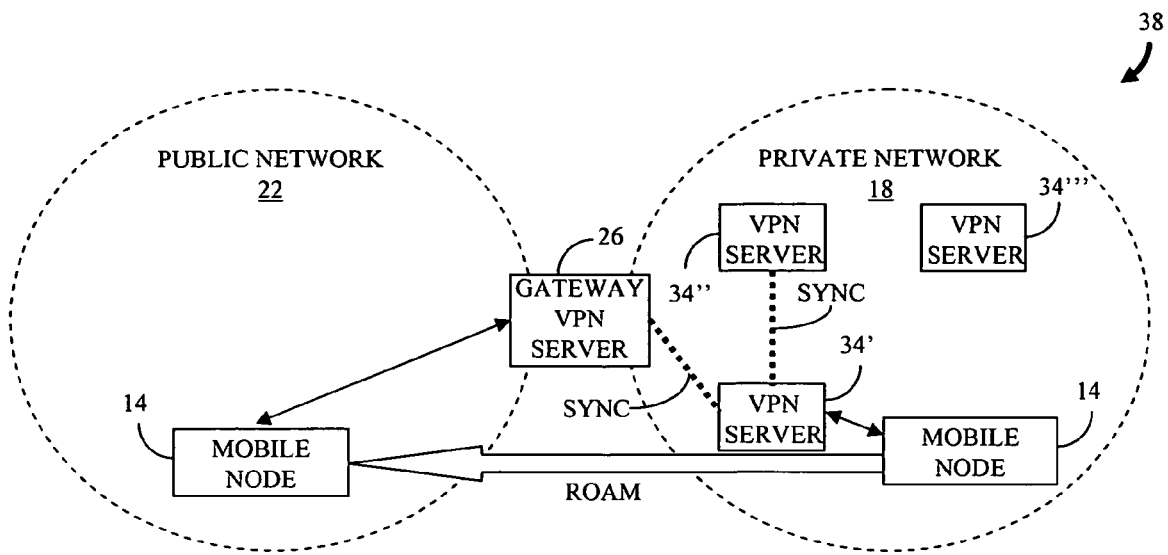
FIG. 4 illustrates a network configuration including an embodiment of a system for seamless roaming of a mobile node during an IPSec session in accordance with the invention.

FIG. 3 is a flowchart representation of an embodiment of a method 100 for seamless roaming of a mobile node in accordance with the invention. FIG. 4 is a network configuration 38 in which the method of FIG. 3 can be practiced. Referring to FIG. 3 and FIG. 4, an IPSec session of a mobile node 14 is established (step 110) with an internal VPN server 34' in a private network 18. The internal VPN server 34' synchronizes (step 120) the IPSec session with fail-over VPN servers 26 and 34". More specifically, the ISAKMP SAs and IPSec SAs are synchronized in a secure manner to the fail-over VPN servers 26, 34". As the mobile node 14 roams outside the private network 18 and into a public network 22, the anchor VPN server 34' becomes unreachable. The mobile node 14 can determine that the anchor VPN server 34' is unreachable by sending an address change message to the server 34' and noting that no reply is received. Alternatively, the mobile node 14 can determine that the anchor VPN server 34' has failed via a "keep alive" mechanism at the operating system level of the user device. Upon determining that the anchor VPN server 34' is unreachable, the mobile node 14 sends (step 130) an address change message to the current VPN server 34' and the fail-over VPN servers 26, 34". Although synchronized for the IPSec session, the internal VPN server 34" does not receive the address change message because the mobile node 14 has left its network. However, the other fail-over VPN server 26 is a gateway server and can therefore receive the address change message through the public network 22. The VPN gateway server 26 sends (step 140) a reply message to the mobile node 14 to indicate that it has received the address change message. The mobile node 14 then registers (step 150) the VPN gateway server 26 as its current VPN server. Subsequent traffic for the IPSec session is tunneled between the mobile node 14 and the gateway VPN server 26. The VPN server 34' which served as the original anchor point for the IPSec session terminates (step 160) the IPSec session based on idleness. Optionally, the newly-registered current VPN server, i.e., VPN gateway server 26, sends a secure message to the original VPN server 34' requesting that the VPN server 34' terminate its participation in the IPSec session.

In general, it is preferable that interval VPN servers 34 configure at least one gateway VPN server as a fail-over server and that gateway VPN servers configure at last one internal VPN server as a fail-over VPN server. Consequently, the most appropriate VPN server is selected during roaming regardless of whether the mobile node 14 roams between two private networks, between a private network and a public network, or between two public networks.

Although the network configuration 38 of FIG. 4 shows only two fail-over VPN servers 26, 34" synchronized with the original anchor server 34', the invention contemplates synchronization with any number of fail-over servers. Moreover, if multiple fail-over servers send a reply message in response to the address change message, the mobile node 14 can employ an algorithm to determine a preferred fail-over VPN server for continuing the IPSec session. For example, the preferred fail-over VPN server can be the one associated with the first-received reply message. Alternatively, the determination of a preferred fail-over VPN server can be based on prioritization of information included in the reply messages. For example, server performance characteristics received in the reply messages can be used to determine the preferred fail-over VPN server as described in more detail below.

Figure 6:
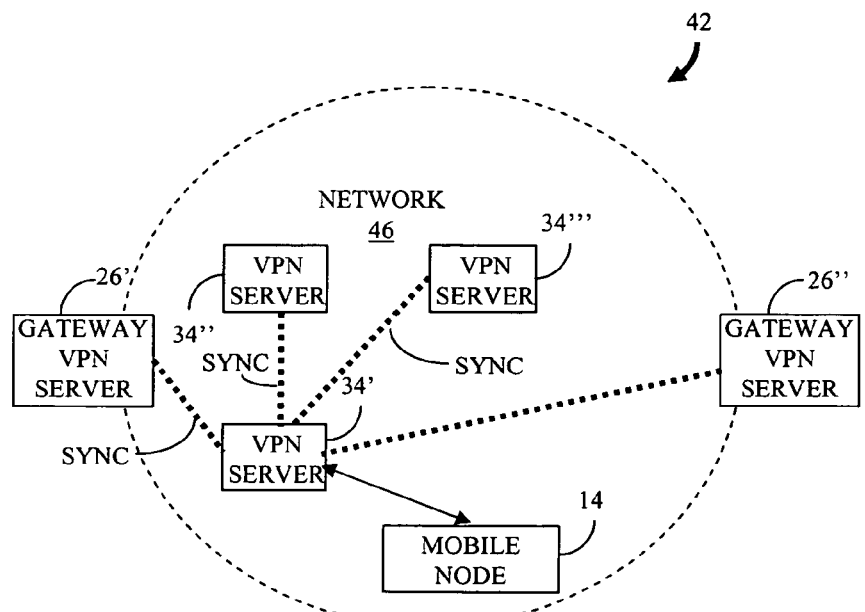
FIG. 6 illustrates a network configuration including an embodiment of a system for load balancing during an IPSec session in accordance with the invention.
Figure 5:
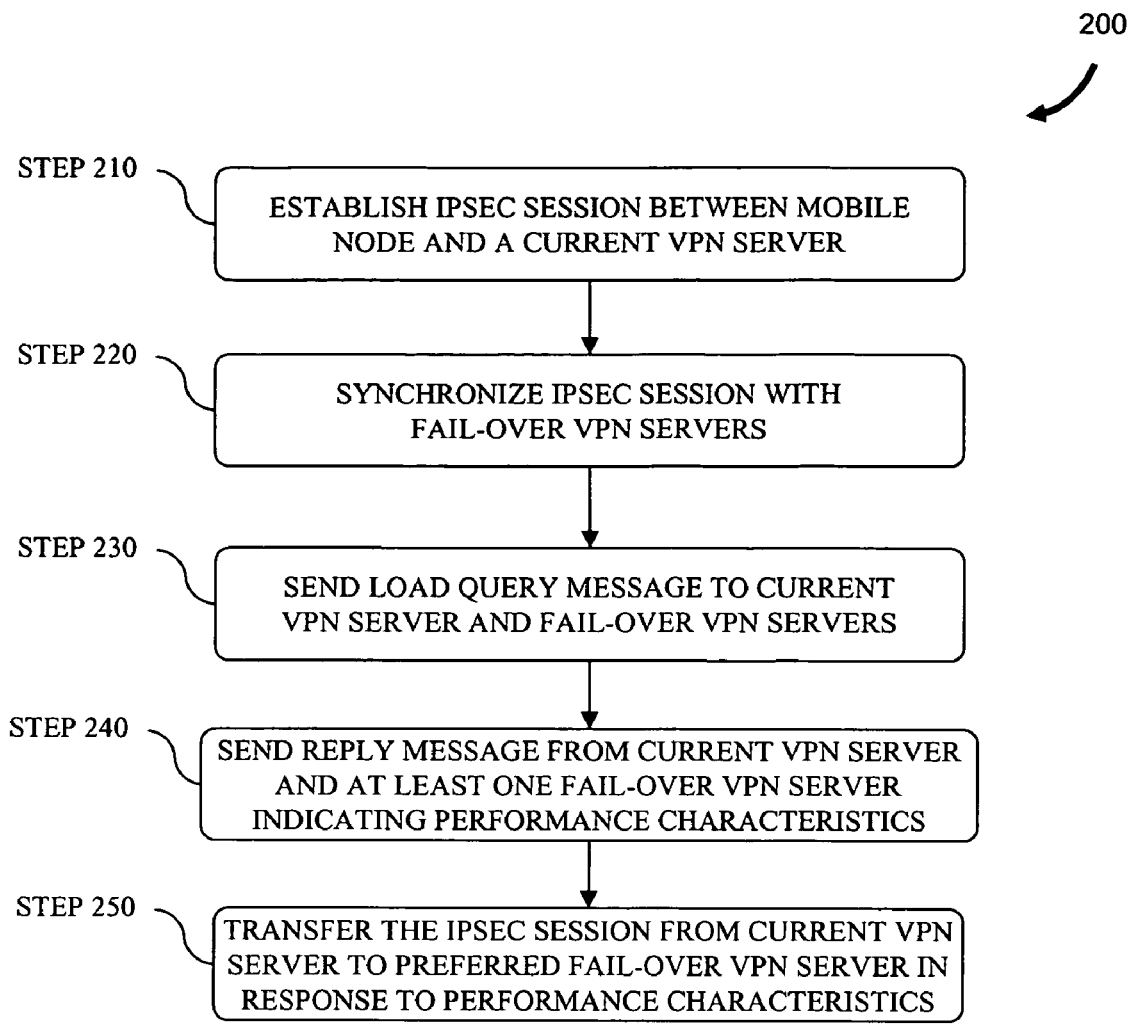
FIG. 5 is a flowchart representation of an embodiment of a method for load balancing during an IPSec session of a mobile node in accordance with the invention.

FIG. 5 is flowchart representation of an embodiment of a method 200 for load balancing during a VPN session of a node in accordance with the invention. FIG. 6 is a network configuration 42 in which the method of FIG. 5 can be practiced. Referring to FIG. 5 and FIG. 6, an IPSec session is established (step 210) between a mobile node 14 and a VPN server 34' in a network 46. The VPN server 34' synchronizes (step 220) the IPSec session with two gateway VPN servers 26' and 26", and two internal VPN servers 34" and 34'", although the invention contemplates more generally any number of gateway VPN servers 26 and internal VPN servers 34 to be used as fail-over VPN servers. Moreover, although FIG. 5 and FIG. 6 describe a mobile node 14, the invention contemplates other nodes, i.e., stationary nodes, that do not change location during the IPSec session.

The mobile node 14 sends (step 230) a load query message to all the VPN servers 26, 34 to determine the performance characteristics on each server. The load query message can be sent periodically at predetermined intervals to monitor changes in server performance characteristics.

In response to the load query message, each VPN server 26, 34 sends (step 240) a reply message that includes its performance characteristics. In some instances, one or more of the fail-over VPN servers 26, 34", 34'" may be unreachable so that no reply message is sent. The load distribution on the fail-over VPN servers 26, 34", 34'" is determined from the reply messages and a preferred VPN server is selected. The IPSec session is transferred (step 250) from the current VPN server 34' to the preferred VPN server to at least partially compensate, or to better distribute, the load on the servers 26, 34.

While the invention has been shown and described with reference to specific embodiments, it should be understood by those skilled in the art that various changes in form and detail may be made therein without departing from the spirit and scope of the invention. For example, the invention is not limited to IPSec sessions but also contemplates other security architectures and protocols that are implemented for VPN sessions.

What is claimed is:

1. A method for seamless roaming of a mobile node during a Virtual Private Network (VPN) session, the method comprising:

synchronizing a VPN session between a gateway VPN server situated as an intermediary between a public network and a private network and an internal VPN server of the private network, the VPN session currently established between the mobile node and the internal VPN server;

receiving a message from the mobile node at the gateway VPN server upon the mobile node determining the internal VPN server is unreachable as the mobile node roams from the private network to the public network, wherein the message indicates a change in the mobile node's IP Address, wherein the message is one of a plurality of messages sent from the mobile node to a plurality of respective VPN servers;

sending a reply message from the gateway VPN server to the mobile node, the reply message comprising server performance characteristics information for the respective VPN server;

receiving a registration from the mobile node at the gateway VPN server, wherein the registration signifies the gateway VPN server as the mobile node's current VPN server for the VPN session, the registration sent from the mobile node based on the server performance characteristics information in the reply message and due to the gateway VPN server's reply being a first reply message received by the mobile node;

receiving traffic from the VPN session at the gateway VPN server; and sending a request from the gateway VPN server to the internal VPN server to terminate the internal VPN server's participation in the VPN session.

2. The method of claim 1 wherein the VPN session is an IPSec session.

3. A non-transitory computer readable storage medium comprising executable instructions encoded thereon operable on a computerized device to perform processing comprising:

synchronizing a VPN session between a gateway VPN server situated as an intermediary between a public network and a private network and an internal VPN server of the private network, the VPN session currently established between the mobile node and the internal VPN server;

receiving a message from the mobile node at the gateway VPN server upon the mobile node determining the internal VPN server is unreachable as the mobile node roams from the private network to the public network, wherein the message indicates a change in the mobile node's IP Address, wherein the message is one of a plurality of messages sent from the mobile node to a plurality of respective VPN servers;

sending a reply message from the gateway VPN server to the mobile node, the reply message comprising server performance characteristics information for the respective VPN server;

receiving a registration from the mobile node at the gateway VPN server, wherein the registration signifies the gateway VPN server as the mobile node's current VPN server for the VPN session, the registration sent from the mobile node based on the server performance characteristics information in the reply message and due to the gateway VPN server's reply being a first reply message received by the mobile node;

receiving traffic from the VPN session at the gateway VPN server; and sending a request from the gateway VPN server to the internal VPN server to terminate the internal VPN server's participation in the VPN session.

4. The non-transitory computer readable storage medium of claim 3 wherein the VPN session is an IPSec session.

5. A computer system comprising:

a processor;

a memory unit that stores instructions associated with an application executed by the processor; and an interconnect coupling the processor and the memory unit, enabling the computer system to execute the application and perform operations of:

synchronizing a VPN session between a gateway VPN server situated as an intermediary between a public network and a private network and an internal VPN server of the private network, the VPN session currently established between the mobile node and the internal VPN server;

receiving a message from the mobile node at the gateway VPN server upon the mobile node determining the internal VPN server is unreachable as the mobile node roams from the private network to the public network, wherein the message indicates a change in the mobile node's IP Address, wherein the message is one of a plurality of messages sent from the mobile node to a plurality of respective VPN servers;

sending a reply message from the gateway VPN server to the mobile node, the reply message comprising server performance characteristics information for the respective VPN server;

receiving a registration from the mobile node at the gateway VPN server, wherein the registration signifies the gateway VPN server as the mobile node's current VPN server for the VPN session, the registration sent from the mobile node based on the server performance characteristics information in the reply message and due to the gateway VPN server's reply being a first reply message received by the mobile node;

receiving traffic from the VPN session at the gateway VPN server; and sending a request from the gateway VPN server to the internal VPN server to terminate the internal VPN server's participation in the VPN session.

* * * * *